May 1, 1945.　　　　P. H. STOKES　　　　2,374,844
REGULATING DEVICE FOR CONTROLLING THE SUPPLY
OF FUEL TO INTERNAL-COMBUSTION ENGINES
Filed July 13, 1943　　　2 Sheets-Sheet 1
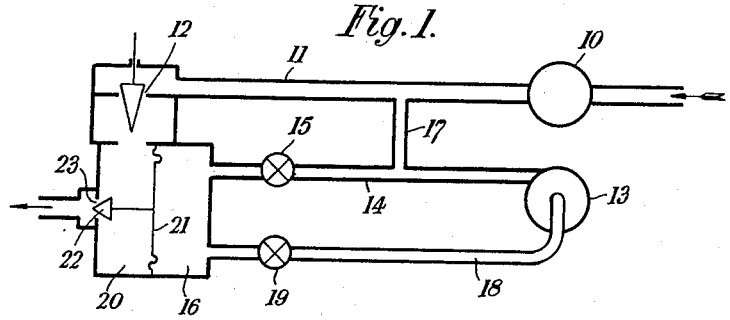
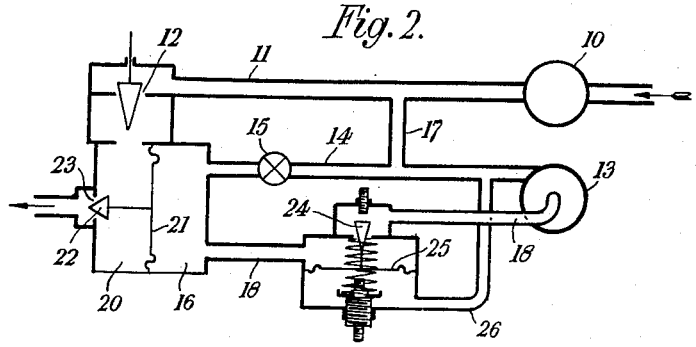
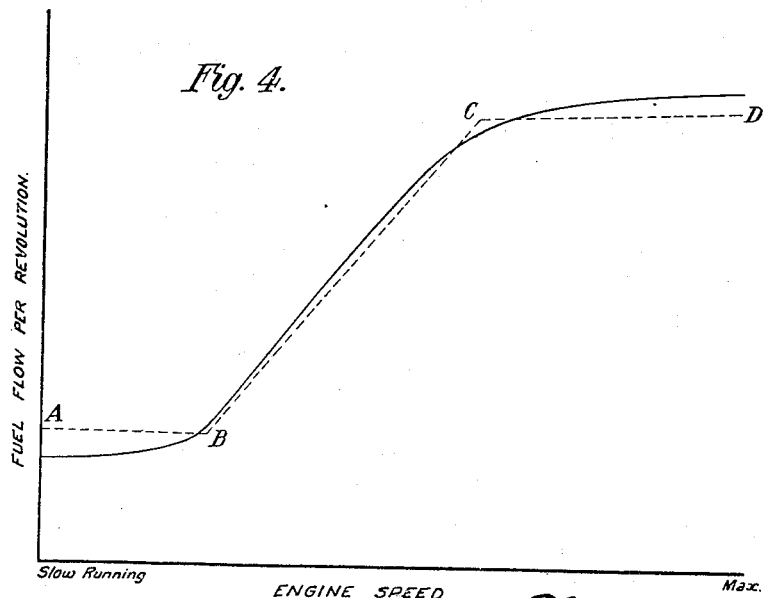

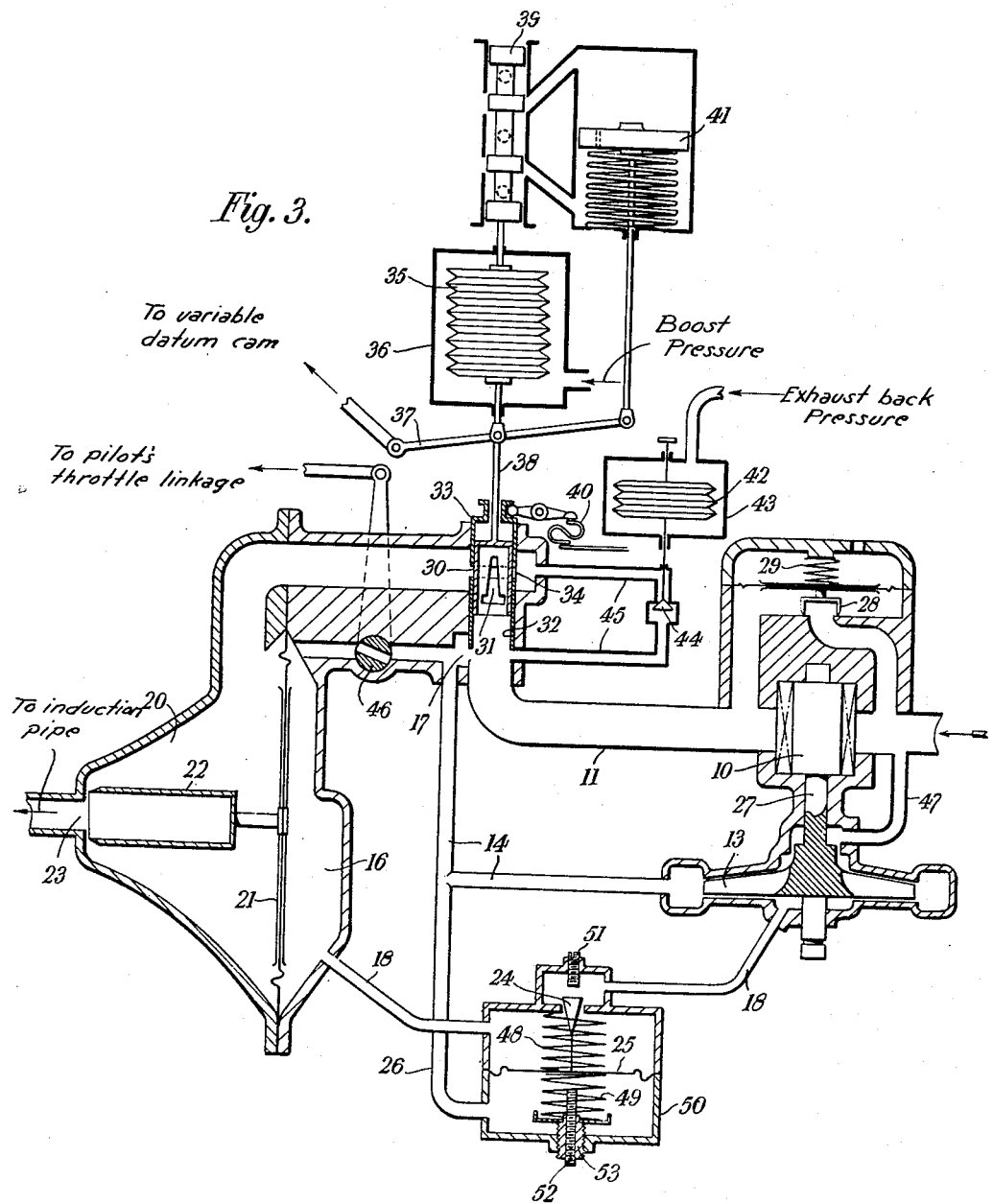

Patented May 1, 1945

2,374,844

UNITED STATES PATENT OFFICE 2,374,844

REGULATING DEVICE FOR CONTROLLING THE SUPPLY OF FUEL TO INTERNAL-COMBUSTION ENGINES

Philip Harold Stokes, Stratford-on-Avon, England, assignor to H. M. Hobson (Aircraft & Motor) Components Limited, Somerset, England Application July 13, 1943, Serial No. 494,514
In Great Britain November 18, 1942

10 Claims. (Cl. 123—119)

A fuel-metering device for internal combustion engines is known in which the rate of flow of fuel to the engine, for a given induction pipe pressure and induction temperature, is made proportional to engine speed by applying across a fuel-metering orifice some fraction of the pressure difference developed by an engine-driven centrifugal impeller.

The rate of flow of fuel through a sharp edged fuel-metering orifice is proportional to the square root of the pressure difference across the orifice. The pressure difference developed by an engine driven centrifugal impeller is proportional to the square of the engine speed, and by applying the pressure difference developed by the impeller across the orifice the desired linear relationship between rate of flow of the fuel and engine speed is accordingly obtained.

Now it is found in some cases that the fuel flow required by an engine is not proportional to engine speed, but is some function of engine speed which can be determined experimentally. The object of the present invention is to modify a fuel-metering device of the above described character in such a way as to obtain a fuel flow according to the desired function.

The invention accordingly provides, in a fuel-metering device for an internal combustion engine, the combination with a fuel-metering orifice, an engine-driven centrifugal impeller, and means for applying across the orifice a fraction of the pressure difference developed by the impeller, of a profiled pressure-regulating valve controlling the flow through one of the connections between the impeller and the orifice (preferably that between the eye of the impeller and the exit side of the orifice), and a pressure-sensitive device mechanically coupled to said valve and responsive to the pressure difference developed by the impeller, the pressure-sensitive device operating to adjust the valve in accordance with changes in engine speed and the profile of the valve determining the relationship between the rate of flow of fuel through the orifice and engine speed.

In some cases it is required to feed other liquids beside fuel to an engine in a determined relationship to the air, which varies with engine speed, for example methanol or water to prevent detonation, and the expression "fuel" as used in the preceding paragraph and in the appended claims is to be understood as including such alternative liquids.

One form of fuel-metering device according to the invention for an aircraft engine will now be described in detail, by way of example, with reference to the accompanying drawings, in which—

Fig. 1 is a diagrammatic representation of the layout of the known class of fuel-metering device to which the invention relates, Fig. 2 is a similar diagram showing a fuel-metering device of this class embodying the invention, Fig. 3 is a detailed diagrammatic showing of the fuel-metering device shown in Fig. 2, and Fig. 4 is a typical volumetric efficiency curve for an aircraft engine fitted with a fuel-metering device according to the invention.

Like reference characters indicate like parts throughout the drawings.

Considering first of all Figure 1, 10 represents an engine-driven pump feeding fuel along a pipe 11 to the entry side of a fuel-metering orifice 12. 13 is an engine-driven centrifugal impeller, the tip of which is connected by a pipe 14, embodying a restriction 15, to the rear chamber 16 of a pressure regulating unit. The pipe 14 is connected to the pipe 11 by a pipe 17, and the eye of the impeller is connected to the chamber 16 by a pipe 18 embodying a restriction 19. The front chamber 20 of the pressure regulating unit, which is separated from the rear chamber 16 by a diaphragm 21 carrying a valve 22, communicates with the exit side of the metering orifice 12. The valve 22 controls the flow of fuel through an outlet 23, the diaphragm 21 adjusting the position of the valve 22 so that the pressure in the chamber 20 equals that in the chamber 16.

The pressure drop across the metering orifice 12 is therefore equal to the pressure drop across the restriction 15, and this, for any fixed size of the restrictions 15, 19, is proportional to the square of the engine speed. As, however, the rate of flow of fuel through the sharp edged metering orifice 12 varies as the square root of the pressure difference across it, the rate of flow of fuel will be proportional to the engine speed, i. e., the fuel delivered to the engine per revolution will be constant irrespective of speed. By decreasing the area of the restriction 19, however, the pressure drop across the restriction 15 will be reduced and the fuel flow per revolution will be reduced proportionately for all speeds.

The engine may, however, have a volumetric efficiency curve (see Fig. 4) such that the fuel flow required per revolution is not constant for all speeds. To this end the restriction 19 in the pipe 18 is formed (see Fig. 2) by a needle valve 24 mechanically connected to a diaphragm 25 across which the pressure of the impeller 13 is applied by pipes 18, 26. The position of the needle valve 24 is therefore governed by the engine speed, and by suitably profiling the needle, a desired relationship between fuel flow per revolution and engine speed at any given boost pressure may be obtained.

Turning now to Fig. 3, it will be seen that the centrifugal impeller 13 is mounted on the same shaft 27 as the main fuel pump 10. A relief valve 28 controlled by a spring 29 permits excess fuel to return to the suction side of the main pump.

The fuel-metering orifice consists of a valve in the shape of a hollow cylinder 30 containing a roughly triangular port 31. This valve 30 slides inside a split sleeve, one part 32 of which is fixed and the other 33 movable and positioned so that there is always a distance between the two portions, known as the slot 34. Movement of the valve 30 and its port 31 in relation to the slot 34 varies the area of the metering orifice. The valve 30 is slidable in the sleeve under the control of a stack of evacuated capsules 35 disposed in a chamber 36 subject to boost pressure and forming part of a variable datum boost control device, so that the area of the metering orifice will be varied in accordance with changes in boost pressure.

The variable datum boost control device is not illustrated in full in Fig. 3. It will be sufficient to state that, as in the case of the apparatus illustrated in Fig. 11 of copending U. S. application, Serial No. 530,428, the variable datum cam operates through a linkage on the left hand end of a cross link 37, centrally pivoted to a rod 38 connecting the capsules 35 and the valve 30. As the pilot's throttle lever is moved the cross link 37 is rocked about its right hand end, thereby adjusting the valve 30 and operating on the capsules 35, thereby displacing a relay valve 39 and causing a servo motor (not shown) to adjust the position of the throttle valve so as to establish the required boost. The movable part 33 of the sleeve, which moves under the control of a Bourdon tube 40 connected to a thermometer bulb (not shown) in the induction manifold, provides a correction in the area of the metering orifice for changes in induction temperature. In addition a resetting piston 41 is provided which operates above the full throttle height, i. e., the altitude at which cruising boost can be sustained only with the throttle valve fully open, to adjust the metering orifice. The operation of this resetting piston is likewise described in U. S. application, Serial No. 530,428.

The area of the fuel-metering orifice is therefore variable to take account of changes in boost pressure and induction temperature. A correction for exhaust back pressure is provided by a stack of evacuated capsules 42 located in a chamber 43 subjected to exhaust back pressure and operating on a valve 44 located in a pipe 45 by-passing the fuel-metering orifice. Variation in the pressure difference across the metering orifice to obtain the desired relationship between fuel flow and engine speed is effected by means of the profiled needle valve 24 as will now be described in detail.

The restriction 15 of Fig. 2 is constituted, in Fig. 3, by a mixture adjustment valve 46 linked to the pilot's throttle lever, so that the size of the restriction is varied appropriately according to the position of the pilot's throttle lever. The flow through the restrictions constituted by the valves 46, 24 is induced by a connection 47 between the eye of the impeller 13 and the inlet side of the main pump 10, which is at a much lower pressure. This ensures a flow of fuel backwards through the impeller which keeps the connecting pipes and the eye of the impeller free from air or vapour.

The profiled valve 24 is shaped to accommodate the known deviation of the engine from the linear relationship between fuel flow and engine speed. It is connected to the diaphragm 25, which is loaded by springs 48, 49 and located in a chamber 50 divided into two sections by the diaphragm. The section of the chamber remote from the valve is connected to the tip of the impeller by the pipe 26 and the other section of the eye of the impeller by the pipe 18. The pressure difference across the diaphragm 25 therefore depends upon the pressure difference developed by the impeller and variations in engine speed consequently cause variations in the position of the diaphragm, and therefore of the profiled valve 24. This effects a corresponding departure from the linear relationship in the rate of flow of fuel through the metering orifice.

Means are provided for limiting the maximum and minimum openings of the profiled valve 24, for the following reason. The volumetric efficiency curve for the engine (Fig. 4), drawn with fuel flow per revolution as ordinates and engine speed as abscissae (assuming constant mixture strength requirements at all speeds), is of roughly S shape, consisting (starting from slow running) of a portion which, though curved, approximates to a horizontal line AB parallel to the axis of abscissae, then a steeply rising portion, which though again curved approximates to a straight line BC inclined to the axis of the abscissae, and finally a further curved portion (at high speeds) which again approximates to a horizontal line CD. At low speeds I assume that the volumetric efficiency corresponds to the horizontal line AB, neglecting the variations due to the curvature of the curve. I similarly neglect the variations at high speeds and assume that the volumetric efficiency is constant and represented by the horizontal line CD. The pressure regulating device is adjusted so that, with the profiled valve at either of its limiting stops 51, 52 the fuel metering pressure across the main metering orifice is held at the values corresponding to the maximum and minimum volumetric efficiencies respectively, while the profile of the valve when acting between the stops serves to take care of the variations from the straight line BC represented by the rising portion of the curve.

Limitation in the permissible maximum and minimum openings of the profiled valve is required to give the correct setting for the upper and lower limits represented by the horizontal lines CD, AB at the top and bottom of the inclined portion of the volumetric efficiency curve. This can be effected by means of adjustable stops 51, 52 for limiting the travel of the profiled valve as shown, or alternatively by having a fixed orifice with a valve arranged in the closed position to give the condition represented by the lower horizontal line and so profiled that it has little effect, if any, at speeds exceeding that corresponding to the upper end of the inclined portion of the curve. The compression of the springs 48, 49 loading the diaphragm associated with the profiled valve is adjustable, by rotating a screwed plug 53, for the purpose of effecting preliminary adjustment of the area of the metering orifice to the size required for a given engine speed. Thereafter the profiled valve will, between the limits imposed by the stops provide a fuel flow which varies in accordance with engine speed as required by the volumetric efficiency curve.

The profiled pressure regulating valve according to the invention can also be used for a different purpose from that described above, viz., to vary the fuel flow per engine revolution, i. e., vary the mixture strength, with speed irrespective of the engine volumetric efficiency characteristic.

An internal combustion engine requires varying mixture strength under varying load conditions, i. e., very rich at slow-running, weak at cruising, then becoming increasingly rich as the power is increased towards full throttle. At present, other means such as boost pressure, are used to control such required variation, but it may be found desirable to control some or all of such required changes in mixture strength by speed alone, under which circumstances this pressure regulating valve could be used for the purpose.

What I claim as my invention and desire to secure by Letters Patent is:

1. In a fuel-metering device for internal combustion engines, the combination with a fuel-metering orifice, means for feeding fuel through said orifice to the engine, an engine-driven centrifugal impeller connections from the eye and tip of said impeller to the exit side and inlet side of said orifice respectively and means associated with said connections for applying across the orifice a fraction of the pressure difference developed by said impeller, of a profiled pressure-regulating valve controlling the flow of fuel through one of said connections, and a pressure-sensitive device mechanically coupled to said valve and responsive to the pressure difference developed by the impeller, the pressure-sensitive device operating to adjust the valve in accordance with changes in engine speed and the profile of the valve determining the relationship between the rate of flow of fuel through the orifice and engine speed.

2. In a fuel-metering device for internal combustion engines, the combination with a fuel-metering orifice, means for feeding fuel through said orifice to the engine, an engine-driven centrifugal impeller, pressure-applying means for applying across the orifice a fraction of the pressure difference developed by said impeller, said pressure-applying means including a connection between the eye of said impeller and the exit side of a profiled pressure-regulating valve controlling the flow of fuel through said connection between the eye of the impeller and the exit side of the orifice, and a pressure-sensitive device mechanically coupled to said valve and responsive to the pressure difference developed by the impeller, the pressure-sensitive device operating to adjust the valve in accordance with changes in engine speed and the profile of the valve determining the relationship between the rate of flow of fuel through the orifice and engine speed.

3. In a fuel-metering device for an internal combustion engine, the combination with a main fuel pipe, an engine-driven pump for feeding fuel through the pipe, a fuel-metering valve in the pipe for controlling the flow of fuel through it, an engine-driven centrifugal impeller, a connection between the tip of the impeller and the entry side of the metering valve, a diaphragm having one surface exposed to the pressure in the main pipe on the exit side of the metering valve, a valve carried by the diaphragm for controlling the flow through the main pipe beyond the metering valve, and a connection for exposing the other surface of the diaphragm to the pressure at the eye of the impeller, of a profiled pressure-regulating valve controlling the flow through said last-mentioned connection, a diaphragm linked to said profiled valve, and connections for subjecting the opposite sides of the diaphragm to the pressures at the eye and at the tip of the impeller respectively.

4. In a fuel-metering device for internal combustion engines, the combination with a fuel-metering orifice, means for varying the effective area of the metering orifice in accordance with changes in induction pipe pressure, means for feeding fuel through said orifice to the engine, an engine-driven centrifugal impeller connections from the eye and tip of said impeller to the exit side and inlet side of said orifice respectively and means associated with said connections for applying across the orifice a fraction of the pressure difference developed by said impeller, of a profiled pressure-regulating valve controlling the flow of fuel through one of said connections, and a pressure-sensitive device mechanically coupled to said valve and responsive to the pressure difference developed by the impeller, the pressure-sensitive device operating to adjust the valve in accordance with changes in engine speed and the profile of the valve determining the relationship between the rate of flow of fuel through the orifice and engine speed.

5. In a fuel-metering device for internal combustion engines, the combination with a fuel-metering orifice, means for varying the effective area of the metering orifice in accordance with changes in induction pipe pressure and induction temperature, means for feeding fuel through said orifice to the engine, an engine-driven centrifugal impeller connections from the eye and tip of said impeller to the exit side and inlet side of said orifice respectively and means associated with said connections for applying across the orifice a fraction of the pressure difference developed by said impeller, of a profiled pressure-regulating valve controlling the flow of fuel through one of said connections, and a pressure-sensitive device mechanically coupled to said valve and responsive to the pressure difference developed by the impeller, the pressure-sensitive device operating to adjust the valve in accordance with changes in engine speed and the profile of the valve determining the relationship between the rate of flow of fuel through the orifice and engine speed.

6. In a fuel-metering device for internal combustion engines, the combination with a fuel-metering orifice, means for feeding fuel through said orifice to the engine, an engine-driven centrifugal impeller connections from the eye and tip of said impeller to the exit side and inlet side of said orifice respectively and means associated with said connections for applying across the orifice a fraction of the pressure difference developed by said impeller, of a profiled pressure-regulating valve controlling the flow of fuel through one of said connections, a pressure-sensitive device mechanically coupled to said valve and responsive to the pressure difference developed by the impeller, and stops for limiting the maximum and minimum openings of said profiled valve, the pressure-sensitive device operating to adjust the valve in accordance with changes in engine speed and the profile of the valve determining the relationship between the rate of flow of fuel through the orifice and engine speed.

7. In a fuel-metering device for an internal combustion engine, the combination with a main fuel pipe, an engine-driven pump for feeding fuel through the pipe, a fuel-metering valve in the pipe for controlling the flow of fuel through it, an engine-driven centrifugal impeller, a connection between the tip of the impeller and the entry side of the metering valve, a diaphragm having one surface exposed to the pressure in the main pipe on the exit side of the metering valve, a valve carried by the diaphragm for controlling the flow through the main pipe beyond the metering valve, and a connection for exposing the other surface of the diaphragm to the pressure at the eye of the impeller, of a profiled pressure-regulating valve controlling the flow through said last-mentioned connection, and a spring-loaded diaphragm coupled mechanically to the profiled valve and exposed at one side to the pressure at the tip of the impeller and at the other side to the pressure at the eye of the impeller.

8. In a fuel-metering device for an internal combustion engine, the combination with a main fuel pipe, an engine-driven pump for feeding fuel through the pipe, a fuel-metering valve in the pipe for controlling the flow of fuel through it, an engine-driven centrifugal impeller, a connection between the tip of the impeller and the entry side of the metering valve, a diaphragm having one surface exposed to the pressure in the main pipe on the exit side of the metering valve, a valve carried by the diaphragm for controlling the flow through the main pipe beyond the metering valve, and a connection for exposing the other surface of the diaphragm to the pressure at the eye of the impeller, of a profiled pressure-regulating valve controlling the flow through said last-mentioned connection, a spring-loaded diaphragm coupled mechanically to the profiled valve and exposed at one side to the pressure at the tip of the impeller and at the other side to the pressure at the eye of the impeller, and stops for limiting the movement of the profiled valve in both directions.

9. In a fuel-metering device for an internal combustion engine, the combination with a main fuel pipe, an engine-driven pump for feeding fuel through the pipe, a fuel-metering valve in the pipe for controlling the flow of fuel through it, an engine-driven centrifugal impeller, a connection between the tip of the impeller and the entry side of the metering valve, a diaphragm having one surface exposed to the pressure in the main pipe on the exit side of the metering valve, a valve carried by the diaphragm for controlling the flow through the main pipe beyond the metering valve, and a connection for exposing the other surface of the diaphragm to the pressure at the eye of the impeller, of a profiled pressure-regulating valve controlling the flow through said last-mentioned connection, a spring-loaded diaphragm coupled mechanically to the profiled valve and exposed at one side to the pressure at the tip of the impeller and at the other side to the pressure at the eye of the impeller, stops for limiting the movement of the profiled valve in both directions and means for varying the loading of said spring.

10. In a device for delivering measured quantities of liquid to an internal combustion engine, the combination with a metering orifice, means for feeding liquid through the orifice to the engine, an engine-driven centrifugal impeller connections from the eye and tip of said impeller to the exit side and inlet side of said orifice respectively and means associated with said connections for applying across the orifice a fraction of the pressure difference developed by said impeller, of a profiled pressure-regulating valve controlling the flow of liquid through one of said connections, and a pressure-sensitive device mechanically coupled to said valve and responsive to the pressure difference developed by the impeller, the pressure-sensitive device operating to adjust the valve in accordance with changes in engine speed and the profile of the valve determining the relationship between the rate of flow of liquid through the orifice and engine speed.

PHILIP HAROLD STOKES.